July 12, 1960

R. F. ONSRUD 2,944,445

BORING FIXTURE

Filed Nov. 26, 1958

INVENTOR:
RUDOLPH F. ONSRUD
BY
ATT'YS

July 12, 1960
R. F. ONSRUD
2,944,445
BORING FIXTURE
Filed Nov. 26, 1958
2 Sheets-Sheet 2
FIG. 3
FIG. 4
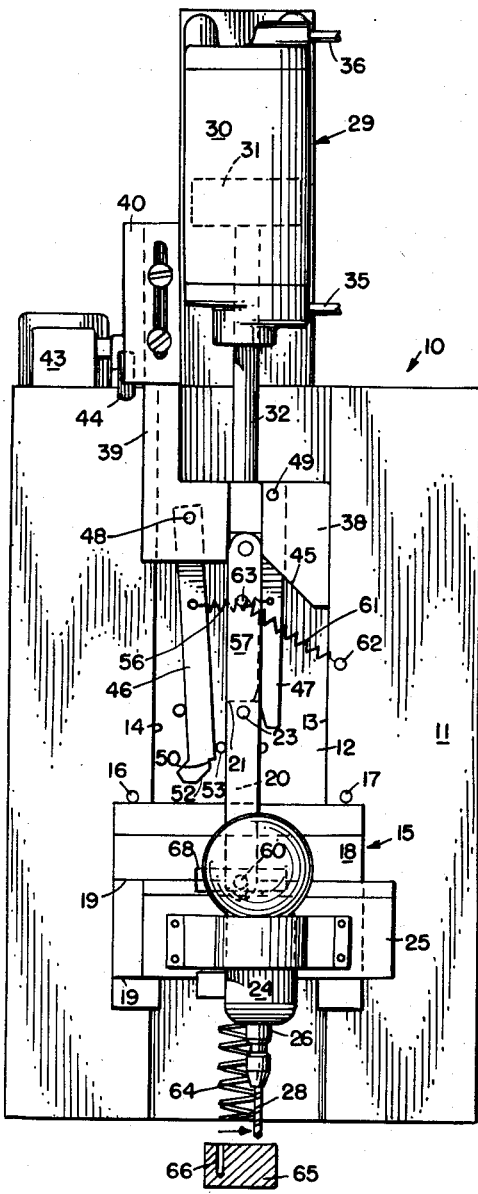
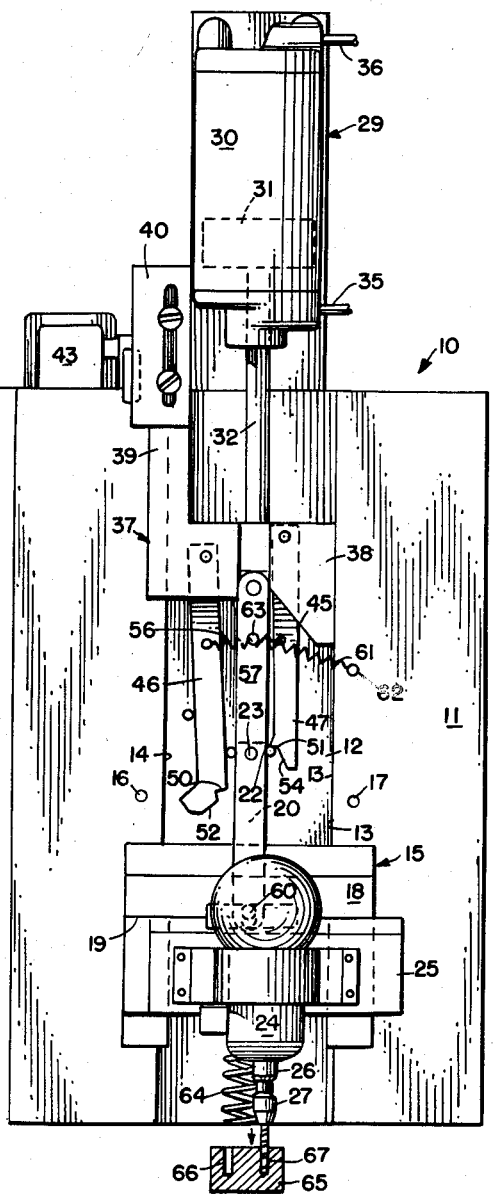
INVENTOR:
RUDOLPH F. ONSRUD
BY
ATT'YS

United States Patent Office 2,944,445
Patented July 12, 1960

2,944,445

BORING FIXTURE

Rudolph F. Onsrud, Chicago, Ill., assignor to Onsrud Machine Works, Inc., Niles, Ill.

Filed Nov. 26, 1958, Ser. No. 776,572

10 Claims. (Cl. 77—5)

This invention relates to a fixure for sequentially boring a plurality of bores in a workpiece. More in particular this invention relates to a fixture for sequentially boring a pair of bores adjacent to each other in a single cycle operation.

In the mass production of certain parts such as some components used in camera and projector assemblies, a given part requires numerous machine operations that are performed in sequence beginning with rough blank to the finished part. Oftentimes to conserve production costs the blanks or workpieces are inserted in a rotatable turret. The turret rotates a predetermined angular displacement carrying the workpiece to a first stage and stops wherein the workpiece is positioned to receive its first machining operation. As soon as the first stage machine operation has been completed the turret again rotates a predetermined angular displacement and again stops wherein the workpiece is positioned to receive its second machining operation. In similar manner the turret is progressively rotated to each succeeding stage and finally after the last stage operation has been performed the finished part is removed from the turret. By such means several parts are receiving different machining operations simultaneously and, in general, requires no more than one operator whose duty is to insert blank workpieces on the initial position and remove finished parts simultaneously. The movement of the turret to effect each of the various stage operations is usually accomplished by automatic means operating in a timed cyclic relation.

Particularly in cases where the requirements of the product part provides for a pair of bores in close spaced relation they cannot be drilled simultaneously in a one stage operation because the diameters of the chucks employed for retaining drills or boring elements impose minimum spacing limitations. Thus in such means the minimum permissible distance between the centers of two bores in a simultaneous boring operation is limited by the average of the diameters of the two associated chucks.

The present invention is particularly directed to overcoming the above described limitation whereby two bores, for example, can be made tangentially to each other in a single stage operation. It is therefore a prime object of this invention to provide a means for drilling or boring a plurality of bores in a workpiece in close proximity to each other in a single stage operation.

Another object of this invention is to provide means for boring a plurality of bores in a workpiece sequentially in close spaced relation in a single stage operation.

A further object of this invention is to provide means for boring a plurality of bores in a workpiece in close proximity to each other in sequential order employing but a single boring element.

A still further object of this invention is to provide means for boring a plurality of bores in a workpiece in automatic sequence.

A yet further object of this invention is to provide means for boring a plurality of bores according to the preceding objects wherein the workpiece is maintained stationary during the boring operation.

Another important object of this invention is to provide a low cost efficient means for boring a plurality of bores sequentially in a stationary workpiece in accordance with the preceding objects.

These and other desirable and important objects inherent in and encompassed by the invention will be more readily understood from the ensuing description, the appended claims and the annexed drawings wherein:

Figure 3 is similar to Figures 1 and 2 showing the position of the component parts when the boring element has been withdrawn from the first bore in the workpiece and has moved transversely to a second position.

Figure 4 is similar to the preceding figures and shows the position of the component parts when the second bore in the workpiece has been accomplished and the boring element is about to retract to the position illustrated in Figure 1.

Figure 1:
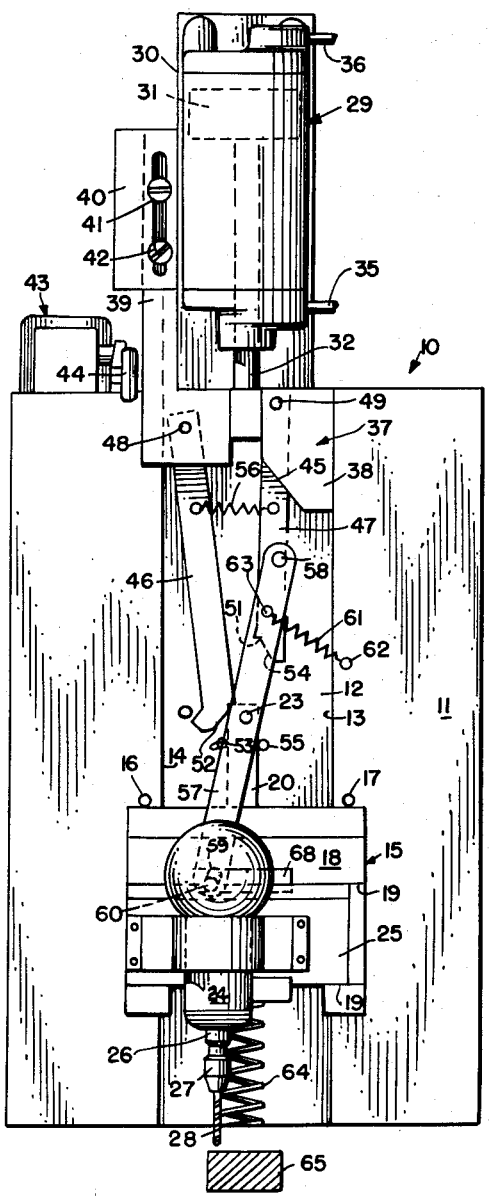
Figure 1 is a plan view of the mechanism of this invention illustrating the position of its components at the start of a boring cycle.

With continued reference to the drawings the numeral 10 generally indicates a fixture comprising a preferred embodiment of this invention. The fixture 10 is provided with a base 11 which may for convenience be a metal plate such as iron or steel. The base 11 is provided with a longitudinally disposed track 12 which may be in the form of a recess or slot in the base 11 having parallel spaced guide walls 13 and 14. Slidably disposed in the forward portion of the track 12 is a driven member generally indicated at 15. If desired the guide walls 13 and 14 of the base 11 may be undercut and the sliding edge (not shown) may be fitted to match in a conventional manner so that the driven member 15 is confined to the track 12. This serves to prevent the driven member 15 from moving in any direction except longitudinally.

In order to prevent retractive or rearward movement of the driven member 15 beyond a predetermined position, the reason for which will become apparent later, stop means are provided on the base 11 which may for convenience be a pair of stop pins 16 and 17.

The driven member 15 may comprise a metal block 18 having a transverse groove 19. The groove of course may be arcuate instead of linear as shown on the drawings. The block 15 is provided with a rearward extending projection or lug 20 rigidly connected thereto. The rearward end of the lug 20 is provided with a pair of laterally disposed shoulders 21 and 22 as best illustrated in Figures 3 and 4. A pivot pin 23 is also positioned on the lug 20 for a purpose to be described later.

Positioned for transverse movement in the groove 19 of the block 18 is a motor, generally indicated at 24, mounted on a plate 25 slidable in the groove 19. Thus the motor 24 and its associated mounting plate 25 is movable with respect to the block 18 in a transverse direction which movement may be limited by the slot 68 in the block 18. The motor 24 is provided with a rotatable element 26 having its axis of rotation positioned longitudinally. The forward end of the rotatable element 26 is provided with conventional chuck or clamping means 27 adapted to secure a drill or boring element 28 for rotation therewith.

The construction of the motor mechanism may be conventional in character such as of the electric type or pneumatic type. The pneumatic type is preferred because in the case where very small bores are to be made using the fixture of this invention, the rotative speed of the boring element 28 may be in the order of 80,000 revolutions per minute which is desirable for certain types of operation. A provided source of energy is connected to the motor 24 in operable relation such as by a flexible hose (not shown) in a conventional manner. Thus means have been described for rotating the boring element 28.

Mounted on the rearward end of the base 11 is a power means which may for convenience be a double-acting fluid cylinder generally indicated at 29. The cylinder is of conventional type comprising a casing 30 having a piston 31 slidably in a longitudinal direction therein. Connected to the piston 31 is a reciprocable work member 32. The cylinder is operatively connected to a source of fluid under pressure such as compressed air with conventional control means interposed to pressurize selectively one of the chambers 33 or 34 through one of the associated fluid conduits 35 or 36 while exhausting fluid from the other of the chambers and its associated conduit. Although a two-way acting cylinder 29 is illustrated a single acting cylinder having a spring positioned in the chamber 33 for retracting the work member 32 when de-energized may also be employed. In fact any type of a power device which is adapted to reciprocate the work member 32 may be employed in this invention.

In the rearward portion of the track 12 is disposed in slidable relation a driving member generally indicated at 37. The driving member 37 is rigidly connected to the work member 32 for reciprocation on the track 12. Similarly as before the driving member 37 may be fitted to the track 12 to confine the movement thereof in a longitudinal direction. The driving member 37 may comprise a metal carrier 38 having a projection 39 extending rearwardly on one side. The projection 39 is provided with a trip plate 40 secured thereto by screws 41 and 42 in a longitudinally adjustable relation. A conventional electric micro switch generally indicated at 43 is mounted on the rear portion of the base 11 positioned for operative engagement of the actuating lever 44 thereof with the trip plate 40.

The carrier 38 of the driving member 37 is provided on the forward portion thereof with a shift cam 45 for a purpose to be described later.

Figure 2:
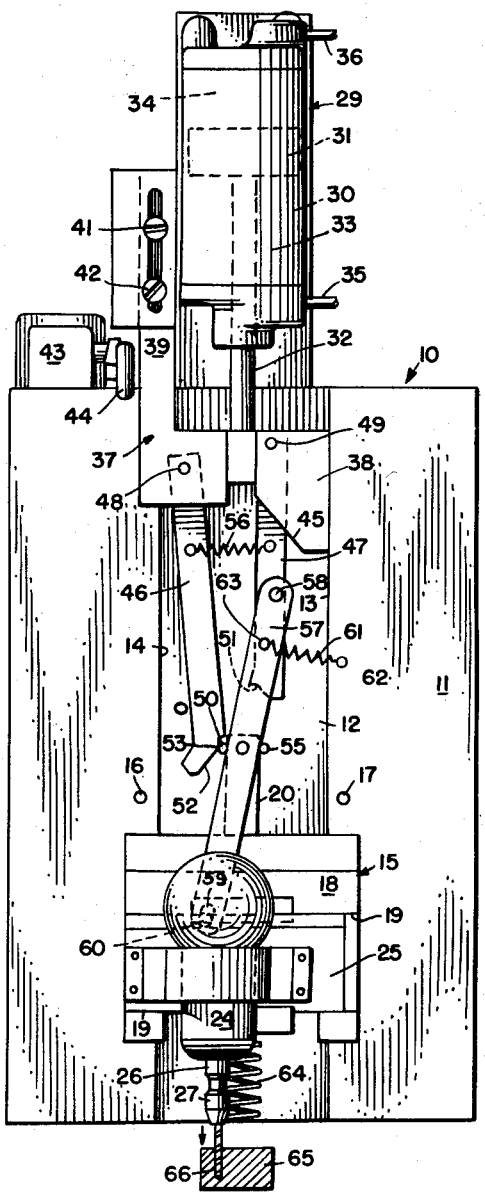
Figure 2 is similar to Figure 1 illustrating the position of the component parts when the first bore in the workpiece has been accomplished and the boring element is about to begin retractive movement.

A pair of fingers 46 and 47 are pivotally connected to the carrier 38 by pins 48 and 49 respectively and extending forwardly as shown in the drawings. Positioned on the forward end portion of the finger 46 is a notch 50 as best shown on Figures 3 and 4. The notch 50 is positioned to engage the shoulder 21 of the lug 20 in forwardly driving relation as shown in Figures 1 and 2. Similarly the finger 47 is also provided with a notch 51 on the forward portion thereof positioned to engage the shoulder 22 of the lug 20 in forwardly driving relation as illustrated in Figures 3 and 4. The notch 51 is positioned rearwardly with respect to the notch 50 for a purpose also to be described later.

On the forward end portion of the finger 46 is a cam 52 having its actuating surface angularly disposed. Mounted on the base 11 is a cam pin 53 positioned to engage the cam 52 when the driving member 37 moves the finger 46 forwardly a predetermined distance to a first release position. The engagement of the cam 52 with the cam pin 53 causes the finger 46 to move arcuately in a clockwise direction about the pivot 48 which disengages the notch 50 from the shoulder 21 thus terminating the forward movement of the driven member 15.

In similar manner as that just described the finger 47 on the forward end portion thereof is a cam 54 having its actuating surface angularly disposed in the opposite direction with respect to cam 52. Mounted on the base 11 is another cam pin 55 positioned to engage the cam 54 when the driving member moves the finger 47 forwardly a predetermined distance to a second release position. The engagement of the cam 54 with the cam pin 55 causes the finger 47 to move arcuately in a counter-clockwise direction about the pivot 49 which disengages the notch 51 from the shoulder 22 thereby again terminating the forward movement of the driven member 15.

As a suitable means for urging the fingers 46 and 47 toward engagement of their respective notches 50 and 51 with the shoulders 21 and 22 a tension spring 56 is anchored at one end thereof to the finger 46 and the other end being anchored to the finger 47 as shown in Figure 1.

Pivotally mounted on the pin 23 of the lug 20 is a shift arm 57. On the rearward portion of the shift arm 57 is a cam follower element 58 positioned for engaging the angular surface of the shift cam 45 on the driving member 37. The forward end portion of the shift arm 57 is provided with an elongated hole 59 for pivot connection with a pin 60, the pin 60 being rigidly mounted on the transversely slidable plate of the motor 24 on the driven member 15. The pin 60 should be of such diameter that it be in close slidable tolerance with respect to the hole 59. The purpose of the hole 59 being elongated is to take up the lost motion between the transversely slidable motor 24 and the arcuate movement of the shift arm 57 about the pivot pin 23 on the lug 20.

In order to urge the cam follower element 58 on the shift arm 57 in a direction toward engagement with the shift cam 45 on the driving member 37 a tension spring 61 is anchored on one end to the base 11 at 62 and the other end thereof being anchored to the shift arm 57 at 63.

Now for the purpose of urging the driven member 15 in a rearward or retractive direction toward the stop pins 16 and 17, a compression spring 64 is anchored on one end to the base 11 and the other end in operative engagement with the driven member 15 as illustrated in each of the drawings. Thus the driven member is always urged in a retractive direction by the spring 64.

Having thus described the construction of a preferred embodiment of the invention, the operation thereof will now be described.

*Operation*

Figure 1 illustrates the position of the mechanism of this invention in the retracted or starting position.

The motor 24 is first energized from a source of energy to cause rotation of the rotatable element 26 thereof with the boring element 28. The motor 24 may for convenience be energized continuously. Next the workpiece 65 is secured rigidly in the required position. The conventional control means is then operated to energize the cylinder 29 by introducing fluid under pressure from a source thereof into the chamber 34 through the conduit 36 to start the cycle of operation. The fluid pressure acting on the piston 31 advances the work member 32 and the driving member 37 in a forward direction. The notch 50 of the finger 46 carried by the driving member 37 immediately engages the shoulder 21 of the lug 20 in driving relation thus advancing forwardly the driven member 15. The boring element 28 carried by the driven member 15 advances to engage the workpiece 65. The cylinder 29 therefore advances both the driving member 37 and the driven member 15 to bore the first bore 66 in the workpiece 65 whereby the mechanism of the invention reaches a first release position illustrated in Figure 2.

From Figure 2 it will be seen that the cam 52 of the finger 46 has engaged the cam pin 53, thereby moving the finger 46 arcuately about the pivot 48 in a clockwise direction which disengages the notch 50 from the shoulder 21. The driven member 15 now being disengaged is moved retractively by the spring 64 to withdraw the boring element 28 from the bore 66 of the workpiece 65 whereby the mechanism of the invention reaches the position illustrated in Figure 3. It should be noted that the driving member 37 is advancing progressively from the initial position shown in Figure 1.

The retractive movement of the driven member 15 from the position shown in Figure 2 to the position shown in Figure 3, causes the cam follower element 58 on the shift arm 57 to engage the shift cam 45 of the driving member 37 which angularly displaces the shift arm 57 about the pivot 23 in a counter-clockwise direction. This rotative movement of the shift arm 57 moves the motor 24 and its associated plate 25 from the leftward position shown in Figures 1 and 2 to the alternate rightward position shown in Figures 3 and 4 in the driven member 15.

The cylinder 29 continues to advance in a forwardly direction to engage the notch 51 of the finger 47 with the shoulder 22 of the lug 20 in driving relation which again advances forwardly the driven member 15 to bore the second bore 67 in the workpiece 65 whereby the mechanism of the invention reaches a second release position illustrated in Figure 4.

When the cylinder 29 has advanced the driving member 37 to the second release position as explained above, the cylinder 29 is then energized in the reverse direction which returns the driving member 37 to its retracted position and the spring 64 retracts the driven member 15 to withdraw the boring element 28 from the second bore 67 of the workpiece 65 to the initial or starting position shown in Figure 1. It will be seen that when the cylinder 29 is fully retracted the cam follower element 58 of the shift arm 57 becomes disengaged from the shift cam 45 of the driving member 37 whereby the urging of the spring 61 angularly displaces the shift arm 57 about the pivot 23 in a clockwise direction. This clockwise movement of the shift arm 57 shifts the motor 24 with its associated plate 25 leftwardly in the groove 19 of the driven member 15 to return the boring element 28 to the initial position shown in Figure 1. Thus a cycle of operation has been completed whereby two juxtaposed bores 66 and 67 have been made in the workpiece in a single stroke of the cylinder 29.

It will be observed in Figure 4 that when the cylinder 29 has advanced the driving member 37 to the second release position, the trip plate 40 engages the actuating lever 44 of the microswitch 43 which in turn actuates a conventional control valve arrangement to reverse the operation of the cylinder 29 thus returning the mechanism from the position shown in Figure 4 to that shown in Figure 1 automatically. Of course it should be understood that retraction of the cylinder 29 may also be accomplished by manual control if desired. However, when the mechanism of this invention is employed in multiple stage turret operation as described previously, the movement of the turret can automatically start the boring cycle when the workpiece reaches to proper position as illustrated.

At this point it should be obvious to one skilled in the art that the distance between centers of the bores 66 and 67 is directly related as a function of the length of the shift arm 57 and the position of the pivot 23 thereon with respect to the longitudinal position of the pivot 23 on the lug 20. The depth of the bores 66 and 67 is governed by the positioning of the workpiece 65 or the position of the shoulders 21 and 22 in respect of the length the fingers 47 as measured between their respective notches 50 and 51 and their respective pivot connections 48 and 49 on the driving member 37.

Having thus described a preferred embodiment of the invention it can now be seen that the objects of the invention have been fully achieved and it must be understood that changes and modifications may be made which do not depart from the spirit of the invention nor from the scope thereof as defined in the appended claims.

What is claimed is:

1. A machine fixture for sequentially boring a pair of parallel disposed bores in a workpiece comprising a base having a longitudinally disposed track thereon, a driven member slidably disposed in the forward portion of said track, stop means mounted on said base positioned to limit rearward movement of said driven member, a lug rigidly connected to said driven member and extending rearwardly in spaced relation with respect to said track, said lug having a first shoulder disposed on the rearward portion thereof and a second shoulder disposed laterally of said first shoulder, said driven member having a groove positioned transversely thereon, a motor having a rotatable element supported in said groove of said first member in slidable relation, said rotatable element having its axis of rotation longitudinally positioned, a boring element removably connected to said rotatable element and extending forwardly of said driven member positioned to engage said workpiece, a driving member slidably disposed in the rearward portion of said track, a double acting fluid pressure operated cylinder mounted on the rearward portion of said base and having a reciprocable work member thereon, said work member being drivingly connected to said driving member in operative relation, a shift cam mounted on the forward portion of said driving member, a shift arm pivotally connected to said motor and said lug and extending rearwardly thereof, a cam follower element disposed on the rearward portion of said shift arm positioned to engage said cam for shifting said motor laterally from an initial position to an alternate position, a first spring mounted on said base positioned to urge said cam follower element of said shift arm toward said cam, a first finger pivotally mounted on one side of said driving member and extending forwardly thereof, a second finger pivotally mounted on the other side of said driving member and extending forwardly thereof, a second spring connected to urge said fingers toward each other, said first finger having a first notch on the forward end portion thereof positioned to engage said first shoulder of said lug in driving relation, a first cam positioned on the forward end portion of said first finger, a first cam pin mounted on said base positioned to engage said first cam for disengaging said first finger from said first shoulder of said lug when said driving member is moved forwardly from an initial retracted position to a predetermined first release position, said second finger having a second notch on the forward end portion thereof positioned to engage said second shoulder of said lug in driving relation, said second notch being positioned rearwardly of said first notch, a second cam positioned on the forward end portion of said second finger, a second cam pin mounted on said base positioned to engage said second cam for disengaging said second finger from said second shoulder of said lug when said driving member is moved forwardly from said first release position to a predetermined second release position, a third spring mounted on said base positioned to urge said driven member rearwardly, a source of energy connected to energize said motor for rotating said boring element, a source of fluid under pressure connected to energize controllably said cylinder to move progressively forward said driving member from a retracted position to engage said first finger with said lug thereby moving said driven member forwardly to said first release position for boring a first bore in said workpiece, said driven member with said shift arm subsequently moving retractively to engage said cam follower element with said shift cam for shifting said motor transversely in said groove to said alternate position, said cylinder moving said driving member from said first release position to engage said second finger with said lug for moving said driven member to a second release position for boring a second bore in said workpiece juxtaposed to said first bore, and means for energizing said cylinder in the other direction to return said driving member to said retracted position.

2. A machine fixture for sequentially boring a pair of parallel disposed bores in a workpiece comprising a base, a driven member reciprocable in a longitudinal direction supported on said base, stop means mounted on said base positioned to limit rearward movement of said driven member, a lug mounted on the rearward side of said driven member, said lug having a first shoulder disposed on the rearward portion thereof and a second shoulder disposed laterally of said first shoulder, said driven member having a groove positioned transversely thereon, a motor having a rotatable element slidably supported in said groove, said rotatable element having its axis of rotation positioned longitudinally, a boring element connected to said rotatable element and extending forwardly thereof positioned to engage said workpiece, a reciprocable driving member supported on said base in axial alinement with said driven member, a fluid pressure operated cylinder mounted on said base and having a reciprocable work member thereon, said work member being drivingly connected to said driving member in operative relation, a shift cam mounted on the forward portion of said driving member, a shift arm pivotally connected to said motor and said lug and extending rearwardly thereof, a cam follower element disposed on the rearward portion of said shift arm positioned to engage said cam for shifting said motor laterally from an initial position to an alternate position, a first spring mounted on said base positioned to urge said cam follower element toward said cam, a first finger pivotally mounted on one side of said driving member and extending forwardly thereof, a second finger pivotally mounted on the other side of said driving member and extending forwardly thereof, a second spring connected to urge said fingers toward each other, said first finger having a first notch on the forward end portion thereof positioned to engage said first shoulder in driving relation, a first cam positioned on the forward end portion of said first finger, a first cam pin mounted on said base positioned to engage said first cam for disengaging said first finger from said first shoulder when said driving member is moved forwardly from a retracted position to a predetermined first release position, said second finger having a second notch on the forward end portion thereof positioned to engage said second shoulder in driving relation, said second notch being positioned rearwardly of said first notch, a second cam positioned on the forward end portion of said second finger, a second cam pin mounted on said base positioned to engage said second cam for disengaging said second finger from said second shoulder when said driving member is moved forwardly from said first release position to a predetermined second release position, a third spring mounted on said base positioned to urge said driven member rearwardly, a source of energy connected to energize said motor for rotating said boring element, a source of fluid under pressure connected to energize controllably said cylinder to move progressively forward said driving member from a retracted position to engage said first finger with said lug thereby moving said driven member forwardly to said first release position for boring a first bore in said workpiece, said driven member with said shift arm subsequently moving retractively to engage said cam follower element with said shift cam for shifting said motor transversely in said groove to said alternate position, said cylinder moving said driving member from said first release position to engage said second finger with said lug for moving said driven member to a second release position for boring a second bore in said workpiece juxtaposed to said first bore, and means for moving said driving member to a retracted position.

3. A machine fixture for sequentially boring a pair of parallel disposed bores in a workpiece comprising a base, a driven member reciprocable in a longitudinal direction supported on said base, stop means mounted on said base positioned to limit rearward movement of said driven member, a lug mounted on the rearward side of said driven member, said lug having a first shoulder disposed on the rearward portion thereof and a second shoulder disposed laterally of said first shoulder, said driven member having a groove positioned transversely thereon, a motor having a rotatable element slidably supported in said groove, said rotatable element having its axis of rotation positioned longitudinally, a boring element connected to said rotatable element and extending forwardly thereof positioned to engage said workpiece, a reciprocable driving member supported on said base in axial alignment with said driven member, power means mounted on said base operatively connected to reciprocate controllably said driving member, a shift cam mounted on the forward portion of said driving member, a shift arm pivotally connected to said motor and said lug and extending rearwardly thereof, a cam follower element disposed on the rearward portion of said shift arm positioned to engage said cam for shifting said motor laterally from an initial position to an alternate position, a first spring mounted on said base positioned to urge said cam follower element toward said cam, a first finger pivotally mounted on one side of said driving member and extending forwardly thereof, a second finger pivotally mounted on the other side of said driving member and extending forwardly thereof, a second spring connected to urge said fingers toward each other, said first finger being positioned to engage said first shoulder in driving relation, a first cam positioned on the forward end portion of said first finger, a first cam pin mounted on said base positioned to engage said first cam for disengaging said first finger from said first shoulder when said driving member is moved forwardly from a retracted position to a predetermined first release position, said second finger being positioned to engage said second shoulder in driving relation when said first finger is disengaged from said first shoulder, a second cam positioned on the forward end portion of said second finger, a second cam pin mounted on said base positioned to engage said second cam for disengaging said second finger from said second shoulder when said driving member is moved forwardly from said first release position to a second release position, a third spring mounted on said base positioned to urge said driven member rearwardly, a source of energy connected to energize said motor for rotating said boring element, said power means being controllable to move progressively forward said driving member from a retracted position to engage said first finger with said lug thereby moving said driven member forwardly to said first release position for boring a first bore in said workpiece, said driven member with said shift arm subsequently moving retractively to engage said cam follower element with said shift cam for shifting said motor transversely in said groove to said alternate position, said power means moving said driving member from said first release position to engage said second finger with said lug for moving said driven member to a second release position for boring a second bore in said workpiece juxtaposed to said first bore, and means for moving said driving member to a retracted position.

4. A machine fixture for sequentially boring a pair of parallel disposed bores in a workpiece comprising a base, a driven member reciprocable in a longitudinal direction supported on said base, a first shoulder disposed on one side of said driven member and a second shoulder disposed on the other side of said member, said driven member having a groove positioned transversely thereon, a motor having a rotatable element slidably supported in said groove, said rotatable element having its axis of rotation positioned longitudinally, a boring element connected to said rotatable element and extending forwardly thereof positioned to engage said workpiece, a reciprocable driving member supported on said base in axial alinement with said driven member, power means mounted on said base operatively connected to reciprocate controllably said driving member, a shift cam mounted on the forward portion of said driving member, a shift arm pivotally connected to said motor and said driven member and extending rearwardly thereof, a cam follower element disposed on the rearward portion of said shaft arm positioned to engage said cam for shifting said motor laterally from an initial position to an alternate position, a first spring mounted on said base positioned to urge said cam follower element toward said cam, a first finger pivotally mounted on one side of said driving member and extending forwardly thereof, a second finger pivotally mounted on the other side of said driving member and extending forwardly thereof, a second spring connected to urge said fingers toward each other, said first finger being positioned to engage said first shoulder in driving relation, a first cam positioned on said first finger, a first cam pin mounted on said base positioned to engage said first cam for disengaging said first finger from said first shoulder when said driving member is moved forwardly from a retracted position to a predetermined first release position, said second finger being positioned to engage said second shoulder in driving relation when said first finger is disengaged from said first shoulder, a second cam positioned on said second finger, a second cam pin mounted on said base positioned to engage said second cam for disengaging said second finger from said second shoulder when said driving member is moved forwardly to a second release position, a third spring mounted on said base positioned to urge said driven member retractively, a source of energy connected to energize said motor for rotating said boring member, said power means being controllable to move progressively forward said driving member from a retracted position to engage said first finger with said driven member thereby moving said driven member forwardly to said first release position for boring a first bore in said workpiece, said driven member with said shift arm subsequently moving retractively to engage said cam follower element with said shift cam for shifting said motor transversely in said groove to said alternate position, said power means moving said driving member from said first release position to engage said second finger with said driven member for moving said driven member to a second release position for boring a second bore in said workpiece juxtaposed to said first bore, and means for moving said driving member to a retracted position.

5. A machine fixture for sequentially boring a pair of parallel disposed bores in a workpiece comprising a base, a driven member reciprocable in a longitudinal direction supported on said base, said driven member having a groove positioned transversely thereon, a motor having a rotatable element slidably supported in said groove, said rotatable element having its axis of rotation positioned longitudinally, a boring element connected to said rotatable element positioned to engage said workpiece, a reciprocable driving member supported on said base in axial alinement with said driven member, power means mounted on said base operatively connected to reciprocate controllably said driving member, a shift cam positioned on said driving member, a shift arm pivotally connected to said motor and said driven member, a cam follower element disposed on said shift arm positioned to engage said cam for shifting said motor laterally from an initial position to an alternate position, a first spring mounted on said base positioned to urge said cam follower element toward said cam, a first finger and a second finger pivotally mounted on said driving member, a second spring connected to urge said fingers toward each other, said first finger being positioned to engage said driven member in driving relation, a first cam positioned on said first finger, a first cam pin mounted on said base positioned to engage said first cam for disengaging said first finger from said driven member when said driving member is moved forwardly from a retracted position to a predetermined first release position, said second finger being positioned to engage said driven member in driving relation when said first finger is disengaged from said driven member, a second cam positioned on said second finger, a second cam pin mounted on said base positioned to engage said second cam for disengaging said second finger from said driven member when said driving member is moved forwardly to a second release position, a third spring mounted on said base positioned to urge said driven member retractively, a source of energy connected to energize said motor, said power means being controllable to move progressively forward said driving member from a retracted position to engage said first finger with said driven member to a first release position for boring a first bore in said workpiece, said driven member with said shift arm subsequently moving retractively to engage said cam follower element with said shift cam for shifting said motor transversely in said groove to said alternate position, said power means moving said driving member from said first release position to engage said second finger with said driven member for moving said driven member to a second release position for boring a second bore in said workpiece juxtaposed to said first bore, and means for retracting said driving member.

6. A machine fixture for sequentially boring a plurality of bores in a workpiece comprising a base, a driven member reciprocable in a longitudinal direction supported on said base, said driven member having a groove positioned transversely thereon, a motor having a rotatable element slidably supported in said groove, said rotatable element having its rotational axis positioned longitudinally, a boring element connected to said rotatable element positioned to engage said workpiece, a reciprocable driving member supported on said base in axial alinement with said driven member, power means mounted on said base operatively connected to reciprocate controllably said driving member, a shift cam positioned on said driving member, a shift arm pivotally connected to said motor and said driven member, a cam follower element disposed on said shift arm positioned to engage said cam for shifting said motor laterally from one position to an alternate position, resilient means mounted on said fixture positioned to urge said cam follower element toward said cam, a first finger and a second finger pivotally mounted on said driving member, yieldable means connected to urge said fingers toward each other, said first finger being positioned to engage said driven member in driving relation, a first cam positioned on said first finger, a first cam pin mounted on said base positioned to engage said first cam for disengaging said first finger from said driven member when said driving member is moved forwardly from a retracted position to a predetermined first release position, said second finger being positioned to engage said driven member in driving relation when said first finger is disengaging from said driven member, a second cam positioned on said second finger, a second cam pin mounted on said base positioned to engage said second cam for disengaging said second finger from said driven member when said driving member is moved forwardly to a second release position, means mounted on said base for urging said driven member retractively, a source of energy connected to energize said motor, said power means being controllable to move progressively forward said driving member from a retracted position to engage said first finger with said driven member to said first release position for boring a first bore in said workpiece, said driven member with said shift arm subsequently moving retractively to engage said cam follower element with said shift cam for shifting said motor transversely in said groove to said alternate position, said power means moving said driving member from said first release position to engage said second finger with said driven member for moving said driven member to a second release position for boring a second bore in said workpiece, and means for retracting said driving member.

7. A machine fixture for sequentially boring a plurality of bores in a workpiece comprising a base, a driven member reciprocable in a longitudinal direction supported on said base, a motor mounted for substantially transverse movement on said driven member, a boring element connected in driven relation to said motor and positioned to engage said workpiece, means on said base positioned to urge said driven member rearwardly, a reciprocable driving member supported on said base in axial alinement with said driven member, power means mounted on said base operatively connected to reciprocate controllably said driving member, a shift cam on said driving member, a shift arm pivotally mounted on said driven member and connected to said motor, a cam follower element disposed on said shift arm positioned to engage said cam for shifting said motor from one position to an alternate position, resilient means mounted on said fixture positioned to urge said follower element toward said cam, a first finger and a second finger pivotally mounted on said driving member, yieldable means connected to urge said fingers in one direction, said first finger being positioned to engage said driven member in driving relation, a first cam positioned on said first finger, a first cam pin mounted on said base positioned to engage said first cam for disengaging said first finger from said driven member when said driving member is moved forwardly from a retracted position to a predetermined first release position, said second finger being positioned to engage said driven member in driving relation when said first finger is disengaged from said driven member, a second cam pin mounted on said base positioned to engage said second cam for disengaging said second finger from said driven member when said driving member is moved forwardly to a predetermined second release position, a source of energy connected to energize said motor, said power means being controllable to move progressively forward said driving member from a retracted position to engage said first finger with said driven member to said first release position for boring a first bore in said workpiece, said driven member with said shift arm subsequently moving retractively to engage said follower element with said shift cam for shifting said motor in substantially a transverse direction to said alternate position, said power means moving said driving member from said first release position to engage said second finger with said driven member for moving said driven member to said second release position for boring a second bore in said workpiece, and means for retracting said driving member.

8. A machine fixture for sequentially boring a plurality of bores in a workpiece comprising a base, a driven member reciprocable in a longitudinal direction supported on said base, a motor mounted for substantially transverse movement on said driven member, a boring element driven by said motor positioned to engage said workpiece, means on said base positioned to urge said driven member retractively, a driving member supported on said base, power means mounted on said base operable to move said driving member, shift means mounted on said fixture adapted to move said motor from one position to an alternate position when said driving member is moved to a predetermined first release position, a first finger and a second finger pivotally mounted on said driving member, yieldable means connected to urge said fingers in one direction, said first finger being positioned to engage said driven member in driving relation, a first cam positioned on said first finger, a first cam pin mounted on said base positioned to engage said first cam for disengaging said first finger from said driven member when said driving member is moved forwardly from a retracted position to said predetermined first release position for boring a first bore in said workpiece, said second finger being positioned to engage said driven member in driving relation when said first finger is disengaged from said driven member, a second cam positioned on said second finger, a second cam pin mounted on said base positioned to engage said second cam for disengaging said second finger from said driven member when said driving member is moved from said first release position to a predetermined second release position for boring a second bore in said workpiece, a source of energy connected to said motor, said power means being controllable to move progressively forward said driving member from a retracted position to engage said first finger with said driven member to said first release position, said driven member subsequently moving retractively to engage said shift means for moving said motor to said alternate position, said power means moving said driving member from said first release position to engage said second finger with said driven member for moving said driven member to said second release position, and means for retracting said driving member.

9. A machine fixture for sequentially boring a plurality of bores in a workpiece comprising a base, a driven member reciprocable in a longitudinal direction supported on said base, a motor mounted for substantially transverse movement on said driven member, a boring element driven by said motor and engageable with said workpiece, a source of energy connected to said motor, resilient means on said base positioned to normally urge said driven member retractively, a driving member slidably supported on said base for longitudinal reciprocation toward and away from said driven member, power means mounted on said base for moving said driving member through a predetermined longitudinal stroke distance, shift means mounted on said fixture for moving said motor laterally from one position to an alternate position when said driving member is advanced to a first release position intermediate the extremes of said stroke distance, releasable means mounted on one of said members and positioned for engaging drivingly the other said member, means for releasing said releasable means from engagement with said other member when said driving member is advanced to said first release position for permitting subsequent retractive movement of said driven member, said releasable means being adapted to re-engage drivingly the other said member when said driving member is advanced longitudinally beyond said first release position, and means for retracting said driving member when the driving member has completed its full stroke distance movement.

10. A machine fixture for sequentially boring a plurality of bores in a workpiece comprising a base, a driven member reciprocable in a longitudinal direction and slidably supported on said base, a boring element mounted on said driven member for lateral movement with respect thereto and for engagement with said workpiece, means on said base for normally urging said driven member retractively, a driving member supported on said base for longitudinal movement toward said driven member, power means mounted on said base for moving said driving member longitudinally through a predetermined stroke distance, shift means mounted on said fixture for moving said boring element laterally on said driven member from one position to an alternate position when said driving member is advanced to a first release position, releasable means mounted on one of said members and positioned for normally engaging drivingly the other said member, means for releasing said releasable means from engagement with said other member when said driving member is advanced to said first release position for permitting subsequent retractive movement of said driven member, said releasable means being adapted to re-engage drivingly the other said member when said driving member is advanced beyond said first release position, and means for retracting said driving member upon completion of its predetermined longitudinal stroke movement.

References Cited in the file of this patent
UNITED STATES PATENTS
1,692,318   Welk _____ Nov. 20, 1928